US006794350B2

(12) United States Patent
Johansen et al.

(10) Patent No.: US 6,794,350 B2
(45) Date of Patent: Sep. 21, 2004

(54) REDUCTION OF MALODOR FROM LAUNDRY

(75) Inventors: Charlotte Johansen, Holte (DK); Signe Munk, Copenhagen (DK)

(73) Assignee: Novozymes A/S, Bagsvaerd (DE)

( * ) Notice: Subject to any disclaimer, the term of this patent is extended or adjusted under 35 U.S.C. 154(b) by 0 days.

(21) Appl. No.: 10/076,231

(22) Filed: Feb. 14, 2002

(65) Prior Publication Data

US 2002/0178509 A1 Dec. 5, 2002

Related U.S. Application Data

(60) Provisional application No. 60/272,620, filed on Mar. 1, 2001.

(30) Foreign Application Priority Data

Feb. 17, 2001 (DK) ........................................ 2001 00270

(51) Int. Cl.[7] ........................... C12S 9/00; D06M 16/00

(52) U.S. Cl. ........................ 510/392; 510/393; 8/115.5; 435/263; 435/264

(58) Field of Search ................................. 510/392, 393; 8/11, 5.5, 115.51, 133; 435/263, 264

(56) References Cited

U.S. PATENT DOCUMENTS

| | | | | | |
|---|---|---|---|---|---|
| 4,496,363 | A | * | 1/1985 | DeFilippi | 8/115.51 |
| 4,810,567 | A | * | 3/1989 | Calcaterra et al. | 442/123 |
| 5,762,948 | A | * | 6/1998 | Blackburn et al. | 424/404 |
| 6,287,585 | B1 | * | 9/2001 | Johansen | 424/405 |

FOREIGN PATENT DOCUMENTS

| | | |
|---|---|---|
| WO | WO 91/10723 | 7/1991 |
| WO | WO 97/31999 | 9/1997 |
| WO | WO 97/43378 | 11/1997 |
| WO | WO 99/09143 | 2/1999 |
| WO | WO 00/31999 | 6/2000 |

* cited by examiner

*Primary Examiner*—Margaret Einsmann
*Assistant Examiner*—Preeti Kumar
(74) *Attorney, Agent, or Firm*—Elias J. Lambiris

(57) ABSTRACT

The present invention relates to methods of reducing malodor in laundry, comprising contacting laundry with an enzyme having lysostaphin activity; and compositions comprising a surfactant and an enzyme having lysostaphin activity.

16 Claims, No Drawings

REDUCTION OF MALODOR FROM LAUNDRY

CROSS-REFERENCE TO RELATED APPLICATIONS

This application claims, under 35 U.S.C. 119, priority of Danish application no. PA 2001 00270, filed Feb. 17, 2001, and the benefit of U.S. provisional application No. 60/272,620, filed Mar. 1, 2001, the contents of which are fully incorporated herein by reference.

FIELD OF THE INVENTION

The invention relates to enzymatic reduction of malodor from laundry.

BACKGROUND

Clothes that have been used for e.g. sports activities or in other ways have been exposed to sweat from the wearer during use are often difficult to clean in terms of the smell of sweat and other body odors (malodor), when subjected to wash in a laundry machine.

SUMMARY OF THE INVENTION

We have found that an enzyme having lysostaphin activity is capable of reducing malodor from laundry. Accordingly, the invention provides a method comprising contacting laundry with an enzyme having lysostaphin activity.

In a second aspect, there is provided a composition comprising a surfactant and an enzyme having lysostaphin activity.

In another aspect, an enzyme is used for reducing malodor in laundry.

DETAILED DESCRIPTION

Lysostaphin

The enzyme Lysostaphin is a glycyl-glycine endopeptidase from the enzyme class E.C. 3.4.24.75. It hydrolyses the —Gly—Gly—bond in the polyglycine inter-peptide link joining staphylococcal cell wall peptidoglycans. Lysostaphin is commercially available from several suppliers, such as from Sigma-Aldrich, Inc.

An enzyme having lysostaphin activity may be a natural or synthetic variant of lysostaphin, wherein amino acid substitutions or deletions have been introduced. It may also be an amino acid fragment with lysostaphin activity, which is optionally fused to one or more other proteins.

Lysostaphin Activity

One unit of lysostaphin activity will reduce the turbidity (absorbance at 620 nm) of a suspension of *Staphylococcus aureus* (ATCC 6538) cells by 50%, when the initial absorbance is approximately 0.250, after 10 minutes at pH 7.5 and 37 degrees Celsius.

Malodor

During wear, fabrics are contaminated with microorganisms from the human skin together with sebaceous lipids, sweat and dead skin cells serving as microbial substrates. Particularly at mild wash conditions these microorganisms survive laundering. A consequence of microorganisms surviving household laundering is malodor generation in the fabrics. We have now found that these microorganisms are mainly Staphylococcus species.

The malodor of the method of the invention thus comprises all body odors present in laundry originating from contact with the human skin. In an embodiment the malodor may be axillary odors, such as the smell of sweat.

In another embodiment, the malodor may originate from activity of Staphylococcus species (such as *S. aureus, S. epidermis, S. intermedius, S. saprophyticus* and *S. hyicus*).

In yet another embodiment the malodor originates from fabrics, which have been in contact with the axilla.

Evaluation of Malodor

Wet laundry swatches are placed in tinted 200 ml glasses with snap lids. A trained sensory panel (10 persons) evaluates the odor by sniffing the headspace over the wet items and indicating the total odor intensity. The odor intensity is indicated on a scale from 0 to 15 where 0 equals 'no malodor' and 15 equals 'very strong malodor'. All evaluations are performed twice (double determinations). The swatches are evaluated after approximately 24 hours and after 48 hours (swatches are kept in the glasses at all times). An average of all 20 evaluations (10 persons each evaluate twice) is calculated after both 24 hours and 48 hours. These average values are referred to as "Malodor index (24 hours)" and "Malodor index (48 hours)".

Laundry

The laundry of the method of the invention comprises all kinds of textile items or fabrics suitable for being used as clothes or for personal use in other ways comprising contact with the human skin.

Methods and Uses

By contacting laundry with an enzyme having lysostaphin activity, as defined in the method of the invention, the "Malodor index (48 hours)", as defined above, may be reduced by at least 10% (preferably 20%, more preferably 30%, most preferably 40%, and in particular 50%) compared to laundry which has not been contacted with an enzyme having lysostaphin activity.

The method of the invention may also result in killing or inhibiting growth of microbial cells in laundry. In an embodiment the microbial cells are bacteria, such as Staphylococcus species. In another embodiment, the method of the invention may result in a reduction in the number of living microbial cells of at least 25%, preferably at least 50%, more preferably at least 90%, and most preferably at least 99%.

In the context of the present invention the term "inhibiting growth of microbial cells" is intended to mean that the cells are in the non-growing state, i.e., that they are not propagating. The term "microbial cells" denotes bacterial cells (such as Staphylococcus species), fungal cells or algae, and the term "microorganism" denotes a fungus (including yeasts) or a bacterium.

The present invention covers use of an enzyme for reducing malodor from laundry items. In an embodiment, the enzyme may have lysostaphin activity. The invention may also be used for reducing the number of living bacteria in laundry; for reducing allergens in laundry; or for sterilizing laundry.

Detergent composition

Lysostaphin may be added to and thus become a component of a detergent composition.

The detergent composition of the invention may for example be formulated as a hand or machine laundry detergent composition including a laundry additive composition suitable for pre-treatment of stained fabrics and a rinse added fabric softener composition, or be formulated as a detergent composition for use in general household hard surface cleaning operations, or be formulated for hand or machine dishwashing operations.

In a specific aspect, the invention provides a detergent additive comprising lysostaphin. The detergent additive as well as the detergent composition may comprise one or more other enzymes such as a protease, a lipase, a cutinase, an amylase, a carbohydrase, a cellulase, a pectinase, a mannanase, an arabinase, a galactanase, a xylanase, an oxidase, e.g., a laccase, and/or a peroxidase.

In general the properties of the chosen enzyme(s) should be compatible with the selected detergent, (i.e. pH-optimum, compatibility with other enzymatic and non-enzymatic ingredients, etc.), and the enzyme(s) should be present in effective amounts.

Proteases: Suitable proteases include those of animal, vegetable or microbial origin. Microbial origin is preferred. Chemically modified or protein engineered mutants are included. The protease may be a serine protease or a metallo protease, preferably an alkaline microbial protease or a trypsin-like protease. Examples of alkaline proteases are subtilisins, especially those derived from Bacillus, e.g., subtilisin Novo, subtilisin Carlsberg, subtilisin 309, subtilisin 147 and subtilisin 168 (described in WO 89/06279). Examples of trypsin-like proteases are trypsin (e.g. of porcine or bovine origin) and the Fusarium protease described in WO 89/06270 and WO 94/25583.

Examples of useful proteases are the variants described in WO 92/19729, WO 98/20115, WO 98/20116, and WO 98/34946, especially the variants with substitutions in one or more of the following positions: 27, 36, 57, 76, 87, 97, 101, 104, 120, 123, 167, 170, 194, 206, 218, 222, 224, 235 and 274.

Preferred commercially available protease enzymes include Alcalase™, Savinase™, Primase™, Everlase™, Esperase™, and Kannase™ (Novozymes A/S), Maxatase™, Maxacal™, Maxapem™, Properase™, Purafect™, Purafect OXP™, FN2™, and FN3™ (Genencor International Inc.).

Lipases: Suitable lipases include those of bacterial or fungal origin. Chemically modified or protein engineered mutants are included. Examples of useful lipases include lipases from Humicola (synonym Thermomyces), e.g. from *H. lanuginosa* (*T. lanuginosus*) as described in EP 258 068 and EP 305 216 or from *H. insolens* as described in WO 96/13580, a Pseudomonas lipase, e.g. from *P. alcaligenes* or *P. pseudoalcaligenes* (EP 218 272), *P. cepacia* (EP 331 376), *P. stutzeri* (GB 1,372,034), *P. fluorescens*, Pseudomonas sp. strain SD 705 (WO 95/06720 and WO 96/27002), *P. wisconsinensis* (WO 96/12012), a Bacillus lipase, e.g. from *B. subtilis* (Dartois et al. (1993), Biochemica et Biophysica Acta, 1131, 253–360), *B. stearothermophilus* (JP 64/744992) or *B. pumilus* (WO 91/16422).

Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079 and WO 97/07202.

Preferred commercially available lipase enzymes include Lipolase™, Lipolase Ultra™ and Lipoprime™ (Novozymes A/S).

Amylases: Suitable amylases ($\alpha$ and/or $\beta$) include those of bacterial or fungal origin.

Chemically modified or protein engineered mutants are included. Amylases include, for example, alpha-amylases obtained from Bacillus, e.g. a special strain of *B. licheniformis*, described in more detail in GB 1,296,839.

Examples of useful amylases are the variants described in WO 94/02597, WO 94/18314, WO 96/23873, and WO 97/43424, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444.

Commercially available amylases are Duramyl™, Termamyl™, Fungamyl™ and BAN™ (Novozymes A/S), Rapidase™ and Purastar™ (Genencor International Inc.).

Cellulases: Suitable cellulases include those of bacterial or fungal origin. Chemically modified or protein engineered mutants are included. Suitable cellulases include cellulases from the genera Bacillus, Pseudomonas, Humicola, Fusarium, Thielavia, Acremonium, e.g. the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259.

Especially suitable cellulases are the alkaline or neutral cellulases having colour care benefits. Examples of such cellulases are cellulases described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307 and PCT/DK98/00299.

Commercially available cellulases include Celluzyme™, and Carezyme™ (Novozymes A/S), Clazinase™, and Puradax HA™ (Genencor International Inc.), and KAC-500 (B)™ (Kao Corporation).

Peroxidases/Oxidases: Suitable peroxidases/oxidases include those of plant, bacterial or fungal origin. Chemically modified or protein engineered mutants are included. Examples of useful peroxidases include peroxidases from Coprinus, e.g. from *C. cinereus*, and variants thereof as those described in WO 93/24618, WO 95/10602, and WO 98/15257.

The detergent enzyme(s) may be included in a detergent composition by adding separate additives containing one or more enzymes, or by adding a combined additive comprising all of these enzymes. A detergent additive of the invention, i.e. a separate additive or a combined additive, can be formulated e.g. as a granulate, a liquid, a slurry, etc. Preferred detergent additive formulations are granulates, in particular non-dusting granulates, liquids, in particular stabilized liquids, or slurries.

Non-dusting granulates may be produced, e.g., as disclosed in U.S. Pat. Nos. 4,106,991 and 4,661,452 and may optionally be coated by methods known in the art. Examples of waxy coating materials are poly(ethylene oxide) products (polyethyleneglycol, PEG) with mean molar weights of 1000 to 20000; ethoxylated nonylphenols having from 16 to 50 ethylene oxide units; ethoxylated fatty alcohols in which the alcohol contains from 12 to 20 carbon atoms and in which there are 15 to 80 ethylene oxide units; fatty alcohols; fatty acids; and mono- and di- and triglycerides of fatty acids. Examples of film-forming coating materials suitable for application by fluid bed techniques are given in GB 1483591. Liquid enzyme preparations may, for instance, be stabilized by adding a polyol such as propylene glycol, a sugar or sugar alcohol, lactic acid or boric acid according to established methods. Protected enzymes may be prepared according to the method disclosed in EP 238,216.

The detergent composition of the invention may be in any convenient form, e.g., a bar, a tablet, a powder, a granule, a paste or a liquid. A liquid detergent may be aqueous, typically containing up to 70% water and 0–30% organic solvent, or non-aqueous.

The detergent composition comprises one or more surfactants, which may be non-ionic including semi-polar and/or anionic and/or cationic and/or zwitterionic. The surfactants are typically present at a level of from 0.1% to 60% by weight.

When included therein the detergent will usually contain from about 1% to about 40% of an anionic surfactant such as linear alkylbenzenesulfonate, alpha-olefinsulfonate, alkyl sulfate (fatty alcohol sulfate), alcohol ethoxysulfate, secondary alkanesulfonate, alpha-sulfo fatty acid methyl ester, alkyl- or alkenylsuccinic acid or soap.

When included therein the detergent will usually contain from about 0.2% to about 40% of a non-ionic surfactant such as alcohol ethoxylate, nonylphenol ethoxylate, alkylpolyglycoside, alkyldimethylamineoxide, ethoxylated fatty acid monoethanolamide, fatty acid monoethanolamide, polyhydroxy alkyl fatty acid amide, or N-acyl N-alkyl derivatives of glucosamine ("glucamides").

The detergent may contain 0–65% of a detergent builder or complexing agent such as zeolite, diphosphate, triphosphate, phosphonate, carbonate, citrate, nitrilotriacetic acid, ethylenediaminetetraacetic acid, diethylenetriaminepentaacetic acid, alkyl- or alkenylsuccinic acid, soluble silicates or layered silicates (e.g. SKS-6 from Hoechst).

The detergent may comprise one or more polymers. Examples are carboxymethylcellulose, poly (vinylpyrrolidone), poly (ethylene glycol), poly(vinyl alcohol), poly(vinylpyridine-N-oxide), poly (vinylimidazole), polycarboxylates such as polyacrylates, maleic/acrylic acid copolymers and lauryl methacrylate/acrylic acid copolymers.

The detergent may contain a bleaching system which may comprise a $H_2O_2$ source such as perborate or percarbonate which may be combined with a peracid-forming bleach activator such as tetraacetylethylenediamine or nonanoyloxybenzenesulfonate. Alternatively, the bleaching system may comprise peroxyacids of e.g. the amide, imide, or sulfone type.

The enzyme(s) of the detergent composition of the invention may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

The detergent may also contain other conventional detergent ingredients such as e.g. fabric conditioners including clays, foam boosters, suds suppressors, anti-corrosion agents, soil-suspending agents, anti-soil redeposition agents, dyes, bactericides, optical brighteners, hydrotropes, tarnish inhibitors, or perfumes.

It is at present contemplated that in the detergent compositions any enzyme, in particular lysostaphin, may be added in an amount corresponding to 0.01–100 mg of enzyme protein per liter of wash liquor, preferably 0.05–10 mg of enzyme protein per liter of wash liquor, more preferably 0.1–5 mg of enzyme protein per liter of wash liquor, and most preferably 0.1–1 mg of enzyme protein per liter of wash liquor.

Lysostaphin may additionally be incorporated in the detergent formulations disclosed in WO 97/07202, which is hereby incorporated as reference.

The present invention is further illustrated in the following examples, which are not in any way intended to limit the scope of the invention as claimed.

EXAMPLES

The chemicals used in the following examples were commercial products of at least reagent grade.

The Malthus Flexi M2060 instrument is available from Malthus Instruments Limited, England.

Tryptone Soya Broth (TSB) is available from Oxoid, England.

CFU: Colony Forming Units.

Example 1

Evaluation of Odor in Swatches Soiled with Human Axillary Sweat and Sebum

The odor reducing effect of lysostaphin is tested in a one-cycle washing trial carried out in a thermostated Terg-O-tometer (available from United States Testing Co, 1415 Park Ave, Hoboken N.J.07030).

Experimental Conditions

Soiling

Swatches of 100% polyester or 100% cotton (10×14 cm, previously cleaned by solvent extraction—hexane for polyester, chloroform for cotton—using a Soxhlet) are soiled by applying human male axillary sweat and sebum from the armpits and upper body of male runners after extensive exercise. Two swatches (10×14 cm) are used for each male—one swatch is made of 100% polyester and one is made of 100% cotton. The left armpit and left part of the upper body is wiped with one swatch, and the right armpit and right part of the upper body is wiped with the other swatch after exercising. This procedure is performed twice before washing. Prior to the washing, each swatch is cut into 12 equally sized pieces and distributed between four Terg-O-tometer wash beakers. Cotton and polyester textiles are kept apart.

Washing

Washing is done in Terg-O-tometer using phosphate buffer (0.05 M, pH 7.5).

| | |
|---|---|
| Temperature: | 32° C. |
| Lysostaphin dose: | 5 mg/L (Sigma L4402) |
| Wash time: | 12 minutes |
| Wash liquid: | 1000 mL per wash beaker |
| Rinsing: | 15 minutes in running tap water |

Sensory Evaluation

After wash the wet swatches are evaluated and "Malodor index (24 hours)" and "Malodor index (48 hours)" are calculated. The results show that a lower "Malodor index (48 hours)" is obtained with the swatches that had been washed with lysostaphin compared to those that had not been washed with lysostaphin.

Example 2

Removal of Bacteria from Textile by Lysostaphin

*Staphylococcus aureus* (ATCC 6538) was grown overnight (TSB; Tryptone Soya Broth) and inoculated to approximately $10^3$ Colony forming units/ml (CFU/ml) in diluted TSB (1:1). Sterile cotton swatches were inoculated overnight in the diluted TSB allowing *S. aureus* to grow on the textile. The swatches were rinsed in sterile water for 30 seconds and dried in sterile air for 30 minutes. Swatches were washed in a beaker with stirring at 32° C. for 20 minutes in either phosphate buffer (0.05 M, pH 7.5) or in a liquid U.S. detergent of a commercial type (0.75 g/liter) with and without addition of 5 mg/L Lysostaphin (Sigma L4402). Three swatches were washed in each beaker. After wash all swatches were rinsed in sterile water for 10 minutes and dried in sterile air. The number of living *S. aureus* on the swatches was determined by incubation of the swatches in Malthus tubes with CASO medium (Merck 1.05459). The bactericidal activity was determined by incubation in Malthus. The detection times (dt) measured by the Malthus instrument were converted to CFU/swatch by a calibration curve (Johansen et al. 1999, Methods in Enzymology, vol 310, p. 353–360). Direct Malthus measurements were used when enumerating total survival cells. By the direct measurements, the cell metabolism was determined by conductance measurements in the growth substrate. The swatches were after enzyme treatment transferred to the Malthus cell. As cells attached to the textile are growing, the cell metabolism will change the conductance in the growth medium. When the conductance change is measurable by the Malthus, a detection time (dt) will be recorded. The dt's were converted to colony counts by use of a calibration curve relating CFU/swatch to dt.

Results

| Swatch | Beaker | Average number of *S. aureus* on each swatch (three swatches washed in each beaker) |
|---|---|---|
| Reference swatches before wash | | $8.8 \times 10^7$ CFU/swatch |
| Washed in phosphate buffer | 1 | $2.2 \times 10^7$ CFU/swatch |
| | 2 | $7.3 \times 10^6$ CFU/swatch |
| Washed in phosphate buffer with | 1 | $4.6 \times 10^6$ CFU/swatch |
| lysostaphin (5 mg/L) | 2 | $1.2 \times 10^5$ CFU/swatch |
| | 3 | $4.8 \times 10^5$ CFU/swatch |

Lysostaphin resulted in a reduction of the microbial cell number of approximately $10^1$ to $10^2$ CFU/swatch. A reduction in cell number was also determined after lysostaphin treatment in detergent, however, the determination of the exact cell number was not possible by using the Malthus. But a delay in outgrowth of the microorganism was observed visually from the swatches washed in detergent with lysostaphin, this delay corresponds to a lower cell number on the swatches compared to the swatches washed without lysostaphin.

What is claimed is:

1. A method of washing a fabric, comprising contacting the fabric with a detergent composition in an aqueous medium, wherein the detergent compositions comprises (a) an enzyme having lysostaphin activity, (b) a surfactant, and (c) one or more of amylase, arabinase, galactanase, lipase, mannanase, pectinase, protease, and xylanase.

2. The method of claim 1, wherein the enzyme is a lysostaphin.

3. The method of claim 1, wherein the detergent composition comprises an amylase.

4. The method of claim 1, wherein the detergent composition comprises an arabinase.

5. The method of claim 1, wherein the detergent composition comprises a galactanase.

6. The method of claim 1, wherein the detergent composition comprises a lipase.

7. The method of claim 1, wherein the detergent composition comprises a mannanase.

8. The method of claim 1, wherein the detergent composition comprises a pectinase.

9. The method of claim 1, wherein the detergent composition comprises a protease.

10. The method of claim 1, wherein the detergent composition comprises a xylanase.

11. The method of claim 1, wherein the detergent further comprises a detergent builder or complexing agent.

12. The method of claim 1, wherein the detergent further comprises a polymer.

13. The method of claim 1, wherein the detergent further comprises a bleaching system.

14. The method of claim 1, wherein the detergent further comprises stabilizing agent.

15. The method of claim 1, wherein the detergent further comprises one or more of a fabric conditioner, foam booster, suds suppressor, anti-corrosion agent, soil-suspending agent, anti-soil redeposition agent, dye, bactericide, optical brightener, hydrotrope, tarnish inhibitor and perfume.

16. The method of claim 1, wherein the washed fabric has a malodor index which is at least 10% less compared to laundry which has not been contacted with an enzyme having lysostaphin activity.

* * * * *